United States Patent [19]
Volk, Jr. et al.

[11] Patent Number: 5,215,251
[45] Date of Patent: Jun. 1, 1993

[54] WATER CONTROLLER

[75] Inventors: Joseph A. Volk, Jr., Creve Coeur, Mo.; Nicholas S. Tsigolaroff, Granite City, Ill.

[73] Assignee: Beta Raven Inc., Earth City, Mo.

[21] Appl. No.: 774,698

[22] Filed: Oct. 9, 1991

[51] Int. Cl.$^5$ .............................. G05D 23/30
[52] U.S. Cl. ................. 236/12.12; 236/12.15; 137/607
[58] Field of Search .............. 236/12.12, 12.11, 12.13, 236/12.14, 12.15; 137/88, 91, 92, 93, 605, 606, 607, 613; 251/129.08

[56] References Cited

U.S. PATENT DOCUMENTS

| | | | |
|---|---|---|---|
| 2,296,266 | 9/1942 | Breckenridge | 236/12.13 |
| 3,434,488 | 3/1969 | Talbot | 236/12.12 |
| 4,359,186 | 11/1982 | Kiendl | 236/12.12 |
| 5,050,062 | 9/1991 | Hass | 236/12.12 |

FOREIGN PATENT DOCUMENTS 2067787  7/1981  United Kingdom ............ 236/12.12

Primary Examiner—Harry B. Tanner
Attorney, Agent, or Firm—Rogers, Howell & Haferkamp

[57] ABSTRACT

A water control includes three water sources which are plumbed into a single supply pipe where a flow meter and temperature sensor is used by a computer to monitor the water flowing therethrough. A valve set controls the flow of water from each water source into the single supply pipe such that a desired amount of water as measured by the flow meter is produced at a desired temperature as is monitored by the temperature sensor. The water sources include a tap water supply with an unregulated temperature, and a cold and hot water source.

14 Claims, 1 Drawing Sheet

WATER CONTROLLER

BACKGROUND AND SUMMARY OF THE INVENTION

For many years, large commercial bakeries have manually prepared batches of ingredients for mixing into large "doughs". These batches which are premixed typically include liquid batches of several ingredients. These ingredients include soy oil, di-malt, yeast, fructose, honey, refiner's syrup, vinegar, and lecithin. These ingredients, along with the dry ingredients of mainly flour, are mixed in large mixers before being further processed into smaller loaves for the baking of bread and other similar bakery products. As an example, for bread, a first set of liquids comprising soy oil, dimalt, water and yeast are added to a "sponge dough" as the materials are first mixed. This sponge dough is then permitted to rise in a dough room before being further processed in a second mixer with a second batch of liquid ingredients comprising liquid sugar (fructose), honey, refiner's syrup (molasses), vinegar, di-malt, lecithin, yeast, and water. In the prior art, these liquid ingredients comprising these two batches (except for water) were hand measured into a bucket which would then be manually dumped into the mixer at each of the two above-described stages of the baking process.

This hand preparation and mixing of liquid ingredients at these two stages of the baking process was very inexact. The amount of each ingredient actually added to the bucket depended entirely upon the measurement made by the operator. Additionally, even if the operator were to make very exacting measurements, a not insubstantial amount of residue remained in the bucket after it was dumped into the mixer. Furthermore, the composition of this residue was inexact and varied from mix to mix such that it could not be adequately accounted for. It should also be noted that the water component of these liquid additions was not actually measured and added by bucket due to the fact that substantially more water is added at each of these two liquid additions. For example, in a typical baking process for bread or the like, 50–60 lbs. of liquid ingredients other than water could be required while the water component might be as much as 400 lbs. As was consistent with the attention given the "active" ingredients, the amount and temperature of the water actually added was never adequately monitored and controlled. Considerable inaccuracy existed in the addition of liquid ingredients, including water, which produced a variation in the product produced by the baking process. This problem became even more acute as the inventors herein participated in an effort to automate the baking process.

In automating this process, a liquid weigh scale hopper and water flush arrangement was developed which permitted a batch of liquid ingredients to be prepared and then flushed completely into a mixer while leaving virtually no residue in the hopper or delivery tube. This was achieved by spraying the chilled water liquid ingredient into the hopper such that it fills it without overflowing to gravitationally help push the liquid batch out of the hopper and flush it while doing so. The liquid hopper is typically sized to hold approximately 180 lbs. of liquid ingredients. As mentioned above, the liquid ingredients comprising a typical batch would range from 50–60 This permits the liquid scale to be loaded to its maximum with an additional 120–130 lbs. of water whose weight helps force the liquid ingredients out through a valve located at the bottom of the hopper. Additionally, the water dilutes the top portion of the liquid ingredient batch which helps eliminate any residue which might form into a ring around the inside of the liquid scale at its fill line, as well as facilitating the flushing of the last portion of the liquid batch out of the hopper and through the delivery tube. Even after the scale is maximally loaded with water, in a typical mix of 400 lbs. of water, another 250 lbs. or more of water is then sprayed against the inside of the hopper and ensures a substantially clean flush of the inside thereof. This development is the subject of a separate patent filing.

In implementing the liquid weigh scale hopper, problems were noticed with regard to the prior art water supply system. Water was delivered in inaccurate quantities and at seemingly uncontrolled temperature from batch-to-batch. Therefore, in order to properly implement and automate the pre-mix batching of the liquids, the inventors herein developed a water control system for accurately monitoring and controlling the water temperature and quantity so as to satisfy the water requirements for each pre-mix batch of liquid ingredients. In essence, this water control includes a temperature sensor and flow meter mounted in the single supply pipe which carries the water to the weigh hopper, a valve set for controlling the flow of water from each of the three water sources, and a computer for monitoring and controlling these various components. The temperature sensor and flow meter are mounted within the first several feet of pipe following the juncture at which water from each of the water sources is plumbed together. Thus, the computer can accurately monitor and control water conditions at their source. Additionally, the valve set includes three on/off valves, one for each of the cold water, hot water, and tap water sources, as well as two modulating valves to vary the flow of water from the hot water and tap water sources. A modulating valve is not provided in the cold water line as cold water is produced at a temperature below that required by the baking process and then tempered up to the desired temperature by water from each of the other two sources as will be explained in greater detail below.

While controlling the flow of water from three water sources in order to provide a single substantial stream of water at a pre-determined temperature might ordinarily seem to be relatively routine, such is not actually the case. First of all, water must be provided in a substantial stream in order to satisfy the spraying requirements of the related invention described above. Furthermore, water should be provided rapidly in order to not interrupt the baking process which is in progress when the liquids are dumped into the mixer from the liquid scale hopper. Because of these high flow rates, the temperature sensor will produce an output which does not exactly track the actual temperature of the water because its response time is not fast enough to follow that temperature change. Therefore, the temperature sensor's response must be adjusted so as to more accurately predict the actual water temperature. Additionally, the control process must be delayed for a pre-determined time delay at the start of each production so that the stale water temperature is not presented to the control as the fresh water temperature. As can be appreciated, as the water sits in the pipes between production runs, its temperature drifts and is not representative of the water temperature which results from the valve settings. Therefore, a time delay is required in order to avoid an incorrect adjustment in valve setting. Still other problems were encountered in trying to control water from three sources. In order to utilize three sources, the inventors have implemented a phase-in control algorithm. With this algorithm, cold water is provided at full flow, tap water is then added by a modulating valve until it reaches 80% of full flow, or until the desired water temperature is reached. At that point, if the output water temperature is still below desired, hot water is throttled in by its modulating valve. In implementing the water control of the present invention, it is believed that tap water need only be used in the summertime in order to raise the cold water temperature to a desired water temperature of a nominal 40° F. However, in wintertime it is believed that the uncontrolled tap water temperature is not sufficiently high enough to achieve the correct temperature by itself. Thus, in winter hot water would also be throttled in such that water from all three sources would be required to achieve the substantial stream of water for flushing the liquid scale hopper of the related invention.

By way of example, the 400 lbs. of water mentioned above for a typical batch is typically provided in 1¼ minutes. This is approximately 37 gallons per minute of water. As the single supply pipe is typically a 2¼ inch nominal O.D. copper pipe (insulated), one can readily see that a substantial flow rate is experienced in order to achieve these water delivery parameters. This flow rate is so substantial that it exceeds the response time of the temperature sensor, as mentioned above. Additionally, it creates a problem for the flow meter as well in that the magnetic coupling relied on to couple the metering disk with the flow disk will be overcome in some situations. For example, should the cold water be turned on first at full flow, the significant in-rush would tend to decouple the flow meter such that it would not accurately track the flow rate of water flowing through the single supply pipe. Therefore, the computer has a control algorithm which requires the tap water line to be throttled open to 20% flow prior to the cold water being turned on. This helps prevent any sudden in-rush from a full off position which could decouple the flow meter and result in faulty flow readings. A flow meter which utilizes a magnetic coupling not only provides less maintenance in that there is no water seal, but it is also less expensive. Hence, use of a magnetically coupled flow meter is highly desirable. For the same reason, valves are utilized with pulse width modulated control interfaces instead of more expensive valves with 4-20 milliamp control interfaces. These modulating valves are pulsed open and closed by the computer but there is no automatic position indication provided to the computer as with the 4-20 milliamp control interface valves. Instead, the computer essentially re-initializes each modulating valve at the start of each water production by pulsing it to close, keeping track of the number of pulses required to achieve close, and then returning it to its previous setting. In this operating mode, the modulating valves remain in their set position from the end of one production to the start of another, and this set position is accurately measured by using the control routine which re-initializes the valve.

While the principal advantages and features of the present invention have been mentioned above, a greater understanding may be attained by referring to the drawing and description of the preferred embodiment which follow.

BRIEF DESCRIPTION OF THE DRAWING

The FIGURE is a diagrammatic view of the water control of the present invention which feeds the liquid scale hopper flush and clean system.

DETAILED DESCRIPTION OF THE PREFERRED EMBODIMENT

Figure 1:
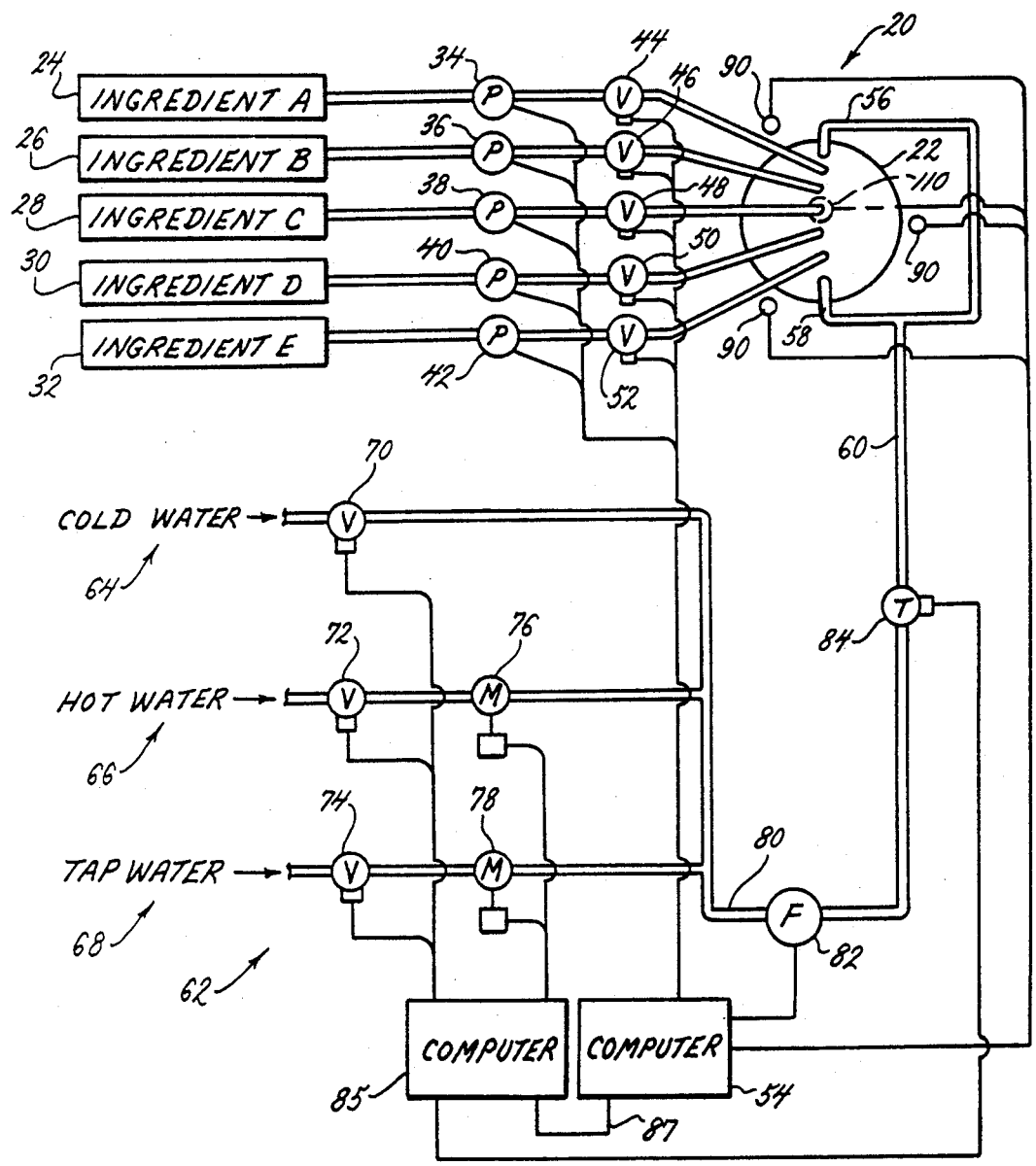

As shown in the FIGURE, a liquids system 20 has at its heart a liquid scale hopper 22 which receives any one or more of liquid ingredients 24-32 as the ingredients are pumped by pumps 34-42 through on/off solenoid valves 44-52. The ingredients 24-32 are identified in the FIGURE as ingredients A-E and they may be any combination or recipe as required for the particular baking process being performed. For example, in making bread, there will typically be a first liquid system 20 at a sponge dough mixer which adds in soy oil (or canola oil), dimalt and liquid yeast. At a second station, after the sponge dough has been prepared and permitted to rise before being placed in a second mixer, the liquid ingredients would typically include liquid sugar (fructose), honey, refiner's syrup (molasses), vinegar, dimalt, lecithin, and liquid yeast. Of course, these particular ingredients are merely exemplary of other liquid ingredients which could be conveniently utilized. Furthermore, as this liquids system 20 is centrally controlled by a main computer 54 or other programmed logic controller, the liquid ingredients 24-32 may be conveniently changed from batch to batch in accordance with the particular recipe for the product being made.

At either side of the top of the liquid scale hopper 22 there is shown chilled water inlets 56, 58 which are supplied from a single supply pipe 60. This single supply pipe 60 carries chilled water produced by the chilled water system 62 of the present invention. The chilled water system 62 includes a cold water source 64, a hot water source 66, and a tap water or city water source 68 which supplies water through the on/off solenoid valves 70-74, with the hot water source 66 and tap water source 68 being further controlled by modulating valves 76-78. Water from each of these water sources 64 is collected into a common water line 80, the flow through which is monitored by a flow valve 82 and the temperature of which is sensed by an electronic temperature sensor 84. As shown in the FIGURE, a second computer 85 senses and controls the various electronic components including valves 70-74, modulating valves 76-78, and temperature sensor 84. The first computer 54 controls the flow of liquid ingredients into the hopper 22 and then calls for chilled water over a data link 87, as required for the dump and flush operation. Flow of chilled water is monitored by first computer 54 by sensing the output of flowmeter 82 so as to know when enough chilled water has been delivered.

Computer 85 is programmed to sense the output temperature of the chilled water by electronic temperature sensor 84 which will yield a temperature either above or below the desired water temperature. Cold water from cold water source 64 is generally colder than the desired temperature of the chilled water such that there is no requirement for a modulating valve in its line. Thus, cold water from cold water source 64 is normally either on or off as the chilled water system 62 is either on or off. In order to raise the temperature of the cold water to approach the desired temperature of the chilled water, the modulating valve 78 is throttled open to add city tap water from any potable water source available at the particular installation. The modulating valve 78 is opened up to as much as approximately 80% in an effort to achieve the desired chilled water temperature. If the chilled water temperature is still below desired temperature, then hot water is added from hot water source 66 by throttling open modulating valve 76. For most installations, it has been found that in the summertime the chilled water temperature of a nominal 40° F. may be achieved by using the cold water source and the city tap water source. However, in wintertime, it has been found that hot water from hot water source 66 is also required in order to achieve a 40° F. chilled water temperature.

It should be noted that for the particular baking process being described as the preferred embodiment, the chilled water system is designated as such because water at 40° F. is being supplied for the baking process. However, it should be understood by those of ordinary skill in the art that different baking processes require water at different temperatures. For example, in some baking processes water at 90° is required. In those instances, the "chilled" water system disclosed herein could very simply be converted to provide water at the desired temperature by simply rearranging the water sources. For example, one such simplistic arrangement would include swapping the hot water source with the cold water source such that hot water would enter the system at full pressure and flow, tap water would be throttled in as necessary to modulate hot water temperature, and then cold water used to the extent that tap water would not adequately modulate the temperature to the desired value, much as in the manner disclosed herein. Such variations on the present "chilled" water system are within the scope of the disclosure of the present system. Undue emphasis should not be placed on the designation of the water system as "chilled".

A complete flow chart and parameter description is provided in Attachment A available within the application file wrapper.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A system for producing a single substantial stream of water in a measured amount and at a pre-determined temperature from at least three water sources, one of said sources being tap water whose temperature is substantially uncontrolled and the other two of said sources having means for producing water at a pre-determined temperature, said pre-determined temperatures being substantially different, said three water sources each having an output line plumbed into a single supply pipe, said system including a programmed logic device, a flow meter in said supply pipe with an output connected to said logic device, a temperature sensor in said supply pipe with an output connected to said logic device, a valve means in each water source output line for controlling the flow of water from its associated water source into said supply pipe, said valve means' being connected to and controlled by said logic device so that said logic device can monitor the temperature and flow rate of water in said single supply pipe and control the input of water from said three sources to thereby supply a measured amount of water at a pre-determined temperature said logic device having means for limiting the inrush of water from said sources by staging the opening of said valve means'.

2. The system of claim 1 wherein the valve means in each water source output line includes a valve for turning its associated water source either on or off.

3. The system of claim 2 wherein the valve means in said tap water output line and the valve means in at least one other water source output line each includes a modulating valve for adjusting the flow rate of water from its associated source to flow rates intermediate full on and full off.

4. The system of claim 3 wherein said modulating valves each include a control interface for positioning its associated valve in the desired orientation corresponding to the desired flow rate, each of said control interfaces being responsive to pulse width modulated (PWM) signals generated by said logic device.

5. The system of claim 4 wherein said logic device has means for maintaining said modulating valves in position at the end of each production of a measured amount of water, and means for verifying their position by moving each of them to their closed position and back to their previous position upon commencement of another production.

6. The system of claim 5 wherein said flow meter has a magnetic coupling type sensor, said sensor being incapable of accurately tracking the flow rate of water if said water exceeds a maximum in-rush, said logic device having means for controlling the valve means to prevent the flow of water in said single supply pipe from exceeding said maximum in-rush.

7. A method for producing a single substantial stream of water in a measured amount and at a pre-determined temperature by using the apparatus of claim 1, said method comprising the steps of:

sensing with said temperature sensor the temperature of water in said single supply pipe, comparing with said logic device said sensed temperature with said pre-determined temperature, controlling with said logic device said valve means' in response to said temperature comparison to thereby select the correct flow rate and type of water needed to maintain said water temperature at said pre-determined temperature, opening said valve means' in stages to thereby limit the inrush of water from said sources, measuring with said flow meter the amount of water produced, comparing with said logic device the amount of water measured to a desired amount, and controlling with said logic device said valve means to thereby produce only enough water as will meet the desired amount.

8. The method of claim 7 further comprising the step of delaying the step of controlling the valve means to adjust the water temperature for a pre-determined time delay at the start of each production to thereby permit fresh water to come in contact with said temperature sensor.

9. The method of claim 8 further comprising the step of controlling the valve means to prevent the flow rate of water in said single supply pipe from exceeding a desired maximum in-rush rate.

10. The method of claim 9 further comprising the step of maintaining the valve means' in their last positions from the end of one production to the start of another.

11. The method of claim 10 wherein the steps of maintaining the valve means' in position includes the step of driving each valve means to its full off position in order to determine its previous position, and returning each valve means back to its previous position.

12. A method for producing a single substantial stream of water in a measured amount and at a pre-determined temperature from three water sources, one of said sources being tap water, said method comprising the steps of:

sensing the temperature of water comprising said substantial stream, comparing said sensed temperature with said pre-determined temperature, controlling the flow rate of water from each of said water sources in response to said comparison to thereby maintain said water temperature at said pre-determined temperature, including limiting the inrush of water into said substantial stream by staging the opening of valves for said water sources, measuring the amount of water produced in said substantial stream, comparing the amount of water measured with a desired amount, and controlling the flow rate of water from each of said sources to thereby produce only enough water as will meet the desired amount.

13. The method of claim 12 further comprising the step of delaying the step of controlling the flow rate in response to said temperature comparison for a pre-determined time delay at the start of each production.

14. The method of claim 13 further comprising the step of maintaining the flow rates for each of said sources from the end of one production to the start of another.

* * * * *